US007636466B2

(12) United States Patent
Saphier et al.

(10) Patent No.: US 7,636,466 B2
(45) Date of Patent: Dec. 22, 2009

(54) SYSTEM AND METHOD FOR INSPECTING WORKPIECES HAVING MICROSCOPIC FEATURES

(75) Inventors: Ofer Saphier, Rehovot (IL); Raanan Adin, Kiryat Ono (IL); David Fisch, Paduelle (IL)

(73) Assignee: Orbotech Ltd, Yavne (IL)

( * ) Notice: Subject to any disclaimer, the term of this patent is extended or adjusted under 35 U.S.C. 154(b) by 801 days.

(21) Appl. No.: 11/329,390

(22) Filed: Jan. 11, 2006

(65) Prior Publication Data

US 2007/0160283 A1    Jul. 12, 2007

(51) Int. Cl.
*G06K 9/00* (2006.01)
(52) U.S. Cl. ...................................... 382/152
(58) Field of Classification Search ................. 382/100, 382/141–152, 255, 190, 205; 356/335, 337, 356/237.1–237.6; 250/201.2–201.3, 559.4–559.46
See application file for complete search history.

(56) References Cited

U.S. PATENT DOCUMENTS

| 5,737,090 | A | 4/1998 | Christopher et al. |
| 5,809,162 | A | 9/1998 | Csipkes et al. |
| 6,781,687 | B2 | 8/2004 | Fisch et al. |
| 7,242,467 | B2 * | 7/2007 | Wienecke ................ 356/237.5 |
| 7,274,444 | B2 * | 9/2007 | Furman et al. ........... 356/237.2 |
| 7,391,510 | B2 * | 6/2008 | Ben-Tulila et al. ....... 356/237.1 |
| 2002/0097400 | A1 | 7/2002 | Jung et al. |
| 2003/0095700 | A1 | 5/2003 | Yu et al. |
| 2004/0218804 | A1 | 11/2004 | Affleck et al. |
| 2004/0246479 | A1 * | 12/2004 | Cartlidge et al. ............ 356/335 |
| 2005/0047640 | A1 | 3/2005 | Eisfeld et al. |
| 2005/0235869 | A1 | 10/2005 | Cruchon-Dupeyrat et al. |
| 2006/0133663 | A1 | 6/2006 | Delaney |
| 2006/0193496 | A1 | 8/2006 | Nagasawa et al. |

OTHER PUBLICATIONS

Y.U. Sun, S. Duthaler, & B. J. Nelson, "Autofocusing in Computer Microscopy: Selecting the Optimal Focus Algorithm", *Microscopy Research and Technique*, vol. 65, No. 3, pp. 139-149, 2004.

* cited by examiner

*Primary Examiner*—Sherali Ishrat
(74) *Attorney, Agent, or Firm*—Sughrue Mion, PLLC

(57) ABSTRACT

Apparatus for high resolution processing of a generally planar workpiece having microscopic features to be imaged, comprising a video camera acquiring at least two candidate images of a microscopic portion on generally planar workpiece; a motion controller operative to effect motion, relative to the workpiece, of at least an optical element of the video camera along an optical axis extending generally normally to a location on a surface of the workpiece, the video camera acquiring the at least two candidate images at selected time intervals, each of the at least two candidate images differing by at least one image parameter; an image selector operative to select an individual image from among the at least two candidate images according to predefined criteria of image quality; and a selected image analyzer operative to analyze at least a portion of the individual image selected by the image selector.

13 Claims, 2 Drawing Sheets

SYSTEM AND METHOD FOR INSPECTING WORKPIECES HAVING MICROSCOPIC FEATURES

FIELD OF THE INVENTION

The present invention relates generally to inspection of workpieces having microscopic features, and more particularly to apparatus and methods for inspection of workpieces including at least one layer of electronic components resting on a substrate.

BACKGROUND OF THE INVENTION

Inspection of workpieces, such as flat panel displays, in the course of their manufacture, is known. One form of inspection includes critical dimension analysis to ascertain the dimensions of various critical features on the workpiece. Very often, the critical features inspected are microscopic in size. The inspection systems employed to perform critical dimension analysis must be finely focused, however the depth of focus of these systems is extremely limited.

SUMMARY OF THE INVENTION

The present invention seeks to provide an improved system for inspection of workpieces having microscopic features such as objects including at least one layer of electronic components resting on a substrate. The system and methods shown and described herein are particularly useful for high-magnification video post-processing of specific locations within completed or only partially fabricated flat panel displays at flat panel display manufacturing sites.

There is thus provided, in accordance with a preferred embodiment of the present invention, apparatus for high resolution processing of a generally planar workpiece having microscopic features to be imaged, comprising a video camera acquiring at least two candidate images for each of selected microscopic portions on generally planar workpiece; a motion controller operative to effect motion, relative to the workpiece, of at least an optical element of said video camera along an optical axis extending generally normally to a location on a surface of the workpiece, said video camera acquiring said at least two candidate images at selected time intervals, each of said at least two candidate images differing by at least one image parameter; an image selector operative to select an individual image corresponding to a selected microscopic portion from among said at least two candidate images according to predefined criteria of image quality, said image selector being operative to avoid delaying acquisition of candidate images for said each of selected microscopic portions; and a selected image analyzer operative to analyze said individual image selected by said image selector corresponding to a selected microscopic portion.

Also provided, in accordance with another embodiment, is a method for collecting images of workpieces having microscopic features, the method comprising acquiring a first plurality of different two-dimensional candidate images, using an image acquirer having an optical head, of a first location to be analyzed on a workpiece; selecting, for further processing, at least one most suitable two-dimensional image from among the first plurality of different two-dimensional images; and analyzing the at least one most suitable two-dimensional image to ascertain therefrom a property of a microscopic feature on said workpiece at the first location.

Further provided, in accordance with another embodiment, is a system for inspection of microscopic objects, the system comprising a candidate image library generator operative to grab and to store, for each individual one of a multiplicity of locations of interest on a microscopic object, a candidate image library comprising a plurality of high magnification candidate images of the individual location of interest differing in at least one imaging parameter; a candidate image selector operative, independently of the candidate image library generator, for each individual one of the multiplicity of locations of interest, to access the individual location's candidate image library and to select an individual one of the candidate images of said individual location in the library for further processing; and a selected image processor operative, for each individual one of the multiplicity of locations of interest, to perform at least one image processing operation on the image selected by said image selector for said individual location of interest, wherein the candidate image library generator operates independently of the candidate image selector.

Additionally provided, in accordance with still another embodiment, is a method for collecting images of workpieces having microscopic features, the method comprising acquiring a first plurality of different two-dimensional candidate images of a first location to be analyzed on a workpiece, using an image acquirer having an optical head, selecting, for further processing, at least one most suitable two-dimensional image from among the first plurality of different two-dimensional images; and moving the image acquirer to a second location to be analyzed on the workpiece to acquire a second plurality of different two-dimensional candidate images at the second location prior to completing selection of the most suitable two dimensional image acquired at the first location.

BRIEF DESCRIPTION OF THE DRAWINGS

Preferred embodiments of the present invention are illustrated in the following drawings.

DETAILED DESCRIPTION

Figure 1:
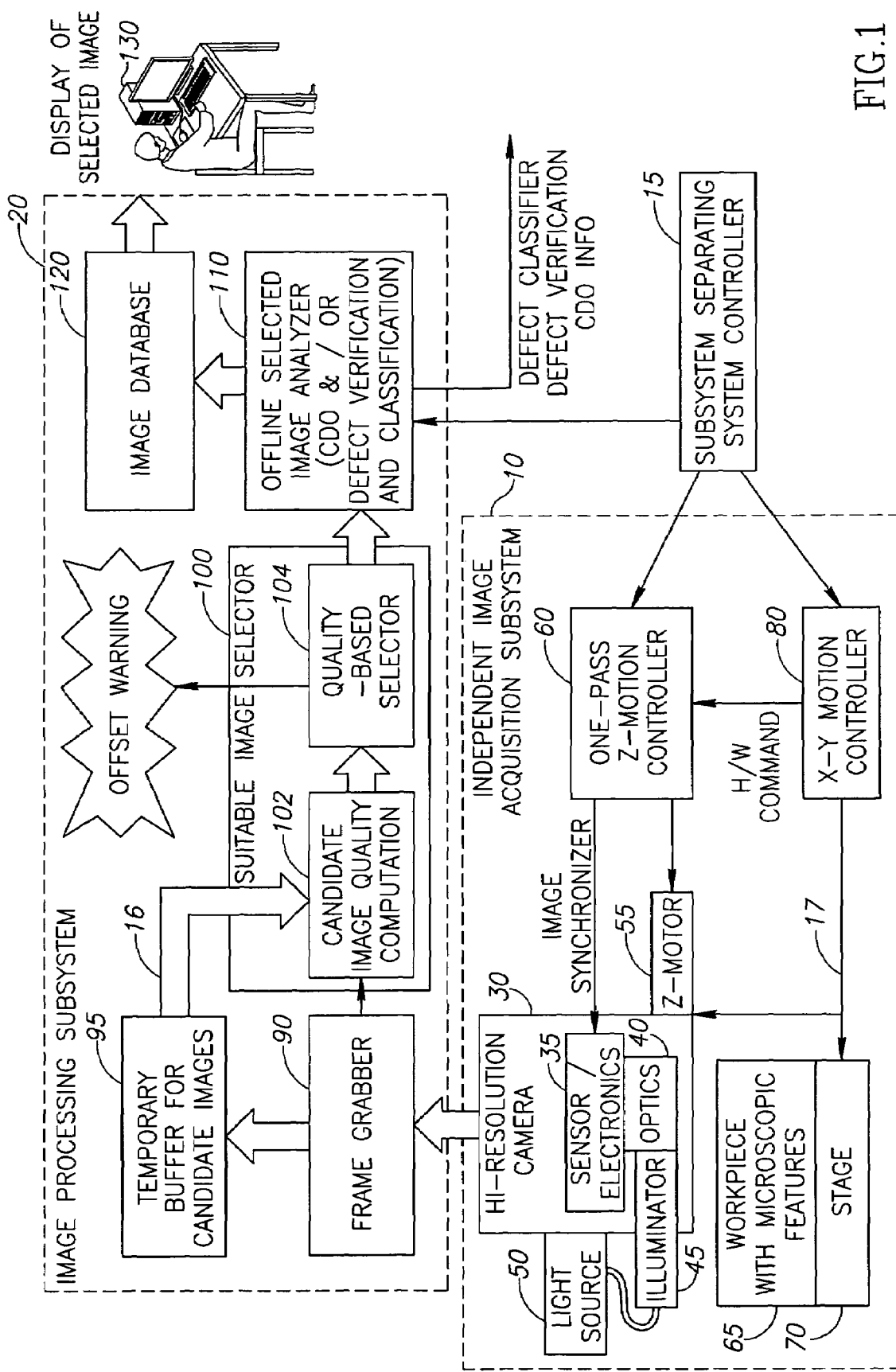
FIG. 1 is a simplified block diagram illustration of a system for inspection of workpieces having microscopic features, the system including a one-pass controller operative to vary the object-imaging head distance during imaging of at least one portion of a workpiece.

Reference is now made to FIG. 1 which is a simplified block diagram illustration of a system for inspection of workpieces having microscopic objects formed thereon. In accordance with an embodiment of the invention, a verification and/or metrological inspection subsystem, which is typically sold as part of an InVision™ automated optical inspection system for inspecting in-fabrication flat panel displays, which is available from Orbotech Ltd. of Yavne, Israel, is adapted to include a one-pass controller operative to vary the workpiece-optical head distance used to image at least one portion of a workpiece having microscopic features. It is appreciated that any suitable type of relative motion may be employed to vary the workpiece-optical head distance, such as moving the entire optical head, or relevant portions thereof, along a z-axis, typically corresponding to an optical axis, while the workpiece remains stationary, or conversely, moving the workpiece along the z-axis while the optical head remains stationary.

The system of FIG. 1 may be employed in a verification system operative to verify candidate defects that are found during an initial inspection, or may be used in a system operative to provide metrological inspection functionality in addition to defect inspection and/or defect verification. The defect verification and metrological functionalities may be combined into a single system or they may be separate. Likewise, the defect verification and metrological inspection functionalities may be combined with a defect inspection system. Optionally, the system of FIG. 1 may be used standalone relative to a defect inspection system. The system of FIG. 1 may be adapted to acquire images for inspection only at those locations where candidate defects were previously identified at an upstream inspection station, or it may be adapted to acquire images at selected locations independently of previously identified candidate defects, for example at statistically relevant locations for the purposes of metrological inspection, or at a set of locations including both candidate defect locations and other locations.

The system of FIG. 1 includes a high magnification image acquisition subsystem 10 and an image processing subsystem 20. The operation of the image acquisition subsystem is typically maintained independent of the operation of the image processing subsystem, by a subsystem separating system controller 15, as described in detail below. Controller 15 typically commands image acquisition subsystem 10 to acquire images at selected locations according to a predefined sequence which may include locations whereat candidate defects have been identified as well as other locations. In FIG. 1, image paths are designated by heavy arrows such as heavy arrow 16 whereas control paths are designated by line arrows such as line arrow 17.

The high magnification image acquisition subsystem 10 typically comprises at least one high resolution video camera 30 including a sensor 35 with operating electronics, optics 40 and an illuminator 45 receiving light from a light source 50. Camera 30 suitably comprises a 3 CCD camera, available from JAI Corporation of Denmark in communication with suitable high magnification optics 40, such as a suitable tube lens and a Leica 10×/0.3 objective. A suitable illuminator 45 provides Kohler illumination using light received from a light source 50, suitably transmitted through optical fibers 55. The illumination may be continuous illumination or flash illumination provided at suitable intervals as the optical head-workpiece distance is varied relative to the workpiece 65. Suitable light sources include halogen lamps, discharge lamps and xenon flash lamps. Optionally, the illuminator may employ LEDs thus obviating a light source that is separate from the illuminator and optical fibers. In embodiments employing flash illumination, camera 30 communicates with the light source (or LEDs) to suitably provide flash illumination during image acquisition.

A z-motor 55, controlled by a one-pass z-motion controller 60, is operative to move the high resolution video camera 30 and/or optics 40 along the z-axis to thereby adjust the focus of images, received by camera 30, of a microscopically featured portion of a workpiece 65. The workpiece 65 may, for example, comprise a feature, for example a portion of a conductor line, in an electronic micro circuit formed on an in-fabrication flat panel display.

Typically, the z-motor 55 and z-motion controller 60 are operative to vary the distance between the workpiece and the imaging head such that the extreme z-axis positions of the workpiece relative to the imaging head bracket a focal range within which a suitable focal distance should be located. In accordance with an embodiment of the invention, the z-motion controller 60 is in operational communication with the z-motor to provide one-pass generally continuous variation of the object-imaging head distance. In parallel, z-motion controller 60 is also in operational communication with sensor 35 to command the sensor to acquire images at selected time intervals while it is being moved by the z-motor 55. This results in the camera acquiring images at selected workpiece-optical head distances.

In other words, the distance between the optical head of the imaging apparatus is typically decreased from a largest initial value to a smallest final value without backtracking to an optimal value, or vice versa, the optical head-workpiece distance is increased from a smallest initial value to a largest final value without backtracking to an optimal distance value. The one-pass variation of optical head-workpiece distance is performed, preferably continuously without stopping, while camera 30 acquires images, typically but not necessarily flash-illuminated, of the microscopic features of workpiece portion 65 at selected, typically incremental, optical head-workpiece distances. In accordance with an embodiment of the invention, incremental changes in the optical head-workpiece distances at which images are acquired may be quite small, typically in the order of a fraction of a micron to several microns only.

For example, one-pass variation of the optical head-workpiece distance may be performed as follows, by controller 60: (a) the system's nominal focus is determined during set up or calibration, as a function of the imaging lens' focal length. (b) The system accepts settable parameters from a system operator, e.g. a range and an increment. The system operator may for example select a focus range of +/−5 microns relative to a nominal focus and an increment of 1 micron. (c) The relative distance along the z axis between the optical head and the workpiece is brought to a value, d, which is at the edge of the range bracketing the known nominal focus of the system as determined during set-up. For example, d may be 15 mm plus 5 microns. (d) 10 candidate images, one micron apart along the z-axis, are generated by activating the image grabbing functionality, and a flash as needed, at time intervals corresponding to one micron intervals as the head-workpiece relative distance varies from 15 mm plus 5 microns, to 15 mm minus 5 microns. (e) Steps (a) to (d) are repeated for each (x,y) location to be imaged, however, if an offset warning is generated by quality based selector 104, indicating that the most suitable candidate images are being found too close to an edge of the focus range, the center of the range, e.g. 15 mm, is globally or regionally increased or decreased accordingly.

If the appropriate optical head-workpiece distance is known to within an accuracy of +/−5 microns, then in order to guarantee the acquisition of a suitably focused image, the sequence of images may comprise 10 images grabbed at optical head-workpiece distances spaced 1 micron apart. This may be achieved by providing constant motion of the optical head relative to the workpiece and providing frame grabbing commands at suitable time intervals along with synchronized or simultaneous flash illumination as appropriate.

In an embodiment of the invention, the z-motion controller 60 continuously moves one or more of the camera 30, at least one optical element in optics 40 and the workpiece 65 including the microscopic portion to be imaged, in the axis, z, perpendicular to the x-y plane of the object 65, and the moving element/s do not stop and do not change direction in the course of acquiring desired images of an individual location. This is in contrast to conventional systems in which initial images, each with a different optical head-workpiece distance bracketing a suspected optimal focal length, are acquired and analyzed to compute an optimal optical head-workpiece distance, and then the optics or optical head-workpiece distance are adjusted, typically requiring a reversal relative to the last employed optical head-workpiece distance, to acquire at least one image at the optimal focal length.

Alternatively, z-motion controller 60 may comprise a fast motion controller such as a piezoelectric motion controller adapted to provide z-axis motion and to stop motion of the camera at selected incremental locations to acquire images at those locations.

As a result, at least one image typically results whose optical head-workpiece distance is close enough to the optical focal length, to provide suitable image quality. This methodology thus enables the camera 30 to acquire a collection of images corresponding to a current (x, y) location in the workpiece portion 65, each image being imaged using a different workpiece-optical head distance, the workpiece-optical head distances of the sequence of images defining, for example, a monotonically increasing or monotonically decreasing sequence of values. Preferably, the sequence of images comprises a plurality of images spanning the entire range of optical head-workpiece distances suitable for the application.

A stage 70 is controlled by an x-y motion controller 80 operative to adjust the relative positions of the camera 30 and the workpiece portion 65 thereby allowing selectable locations in the x-y plane defined by the workpiece portion to be imaged in turn. As previously noted, the selected locations may include candidate defect locations that have been previously identified in an automatic optical inspection process, or other locations selected independently of automatic optical inspection—for example locations that are selected for metrological analysis. In accordance with an embodiment of the invention, however, camera 30 is particularly directed to acquire images for metrological analysis at least at candidate defect locations.

The image processing subsystem 20 typically is operative independently of image acquisition subsystem 10 such that image acquisition may proceed whether or not the selection and processing of suitable images has been completed. Thus, in an embodiment of the invention, image processing subsystem 20 comprises a frame grabber 90 receiving images from the camera 30 and producing image frames that are storable, e.g. in a temporary buffer 95 which typically comprises a FIFO. The image frames are typically both storable and processable in a computer image processing medium as described in detail below.

A suitable image selector 100 receives image frames grabbed by frame grabber 90 e.g. by accessing buffer 95, and performs a selection process to select a suitable image for further processing, such as for defect verification or metrology processing. In accordance with an embodiment of the invention, where operation of the suitable image selector is sufficiently fast, it may possible to select an image for further processing before image acquisition subsystem 10 has completed acquisition of all of the images that had been initially planned for acquisition at a given (x, y) location. In such a circumstance, the suitable image selector 100 may output an indication that a suitable image has been selected and the x-y motion controller 80 will move the camera 30 and/or stage 70 so as to begin acquiring images at a next location.

Initially, a candidate image quality computation module 102 evaluates at least one image suitability criterion, for example the quality of focus or sharpness, for each of the acquired image frames and then assigns an image suitability measure to each grabbed frame. A quality based selector module 104 then evaluates the respective suitability measures assigned to image frames in the collection of grabbed images for each location of workpiece portion 65 and then selects for further processing at least one suitable image frame representative of a given location. Suitable focus criteria are known in the art and are described, for example, in the following reference, the disclosure of which is hereby incorporated by reference: Y. U. Sun, S. Duthaler, & B. J. Nelson, "Autofocusing in Computer Microscopy: Selecting the Optimal Focus Algorithm", *Microscopy Research and Technique*, Vol. 65, No. 3, pp. 139-149, 2004.

According to an embodiment of the present invention, the following focus criterion (focus grade) may be used by module 102:

a. Compute the mean of the difference image in the x direction. Similarly, compute the mean of the square sum of the difference image in the y direction.

b. Compute a squared gradient by adding the two square sums computed in (a).

In other words, the output of steps (a) and (b) may be:

$$\frac{1}{N}\sum_{allpixels} ((I(x, y) - I(x-1, y))^\wedge 2 + ((I(x, y) - I(x, y-1))^\wedge 2)$$

where I(x,y) is the gray level of a pixel whose coordinates are (x,y) and N is the number of pixels in the image.

c. When computing best focus for a polychromatic image, for each spectral band (for example R, G and B), compute a per-band focus grade by squaring the R, G or B image's average gray level (average over all pixels in the image) and dividing by the squared gradient from (b). Compute the average of the three per-band focus grades to obtain a focus grade for the polychromatic image as a whole.

d. The best focused image is then typically selected by module 104 to be the image with the smallest focus grade.

Preferably, the image selector 100 generates an offset warning message if the selected image comprises one of the first or one of the last images in the imaged sequence. The warning message is provided so that the operator of the system of FIG. 1 or system controller 15 can calibrate the autofocus of the image-acquisition subsystem 10 to eliminate the offset.

At least one suitable image from among image frames grabbed for each image location is selected, typically comprising a single image which is better focused than the other, non-selected images. The selected image frame may or may not be an image that is acquired at the most optimal focus for a given location, however the respective z-locations at which images are acquired by camera 30 typically are selected so that at least one suitably good image is available for further processing. An independent, typically non-real-time image analyzer 110, which typically does not receive feedbacks from the image acquisition subsystem 10, provides image analysis of the selected image frame which proceeds offline with respect to the image grabbing subsystem 10, i.e. substantially independently thereof. Analysis may comprise critical dimension analysis in which critical dimensions of selected microscopic electronic components in the workpiece are checked, for example the width of conductors or dimensions of a flat panel display pixel. Alternatively, defect verification in which, typically, previously identified candidate defects are verified and classified may be conducted. The critical dimension analysis and defect verification may, or may not, be performed on one or more images acquired at the same location.

In accordance with an embodiment of the invention, the image analyzer 110 outputs an inspection result. Optionally, in addition, analyzed images may be provided to an image database 120, for example EYES-2020™ available from Orbotech Ltd. of Yavne, Israel, for later review. The image database 120 typically has an operator sensible display 130 associated therewith.

Optionally, more than one type of image may be grabbed at each optical head-workpiece distance, or during traversal of camera 30 through a range of focus distances. For example, both a dark field image and a bright field image may be grabbed for each optical head-workpiece distance, or a red image, green image and blue image may each be grabbed for each optical head-workpiece distance. In these applications, typically, a best available image of each type is selected. For example, the best available dark field image of a particular location and the best available bright field image of a particular location may be identified. The two images may or may not have been imaged at precisely the same optical head-workpiece distance. Alternatively, the best available red, green and blue images may each be selected, and the three images resulting from the selection may or may not have been generated at the same optical head-workpiece distance.

In accordance with an embodiment of the invention, a best image acquired under a first illumination, for example a best bright field or a best red image, is selected, and a best image acquired under a second illumination, for example a best dark field or best blue image, are selected. Both of the best images are subsequently analyzed, either separately or in combination, by image analyzer 20.

Figure 2:
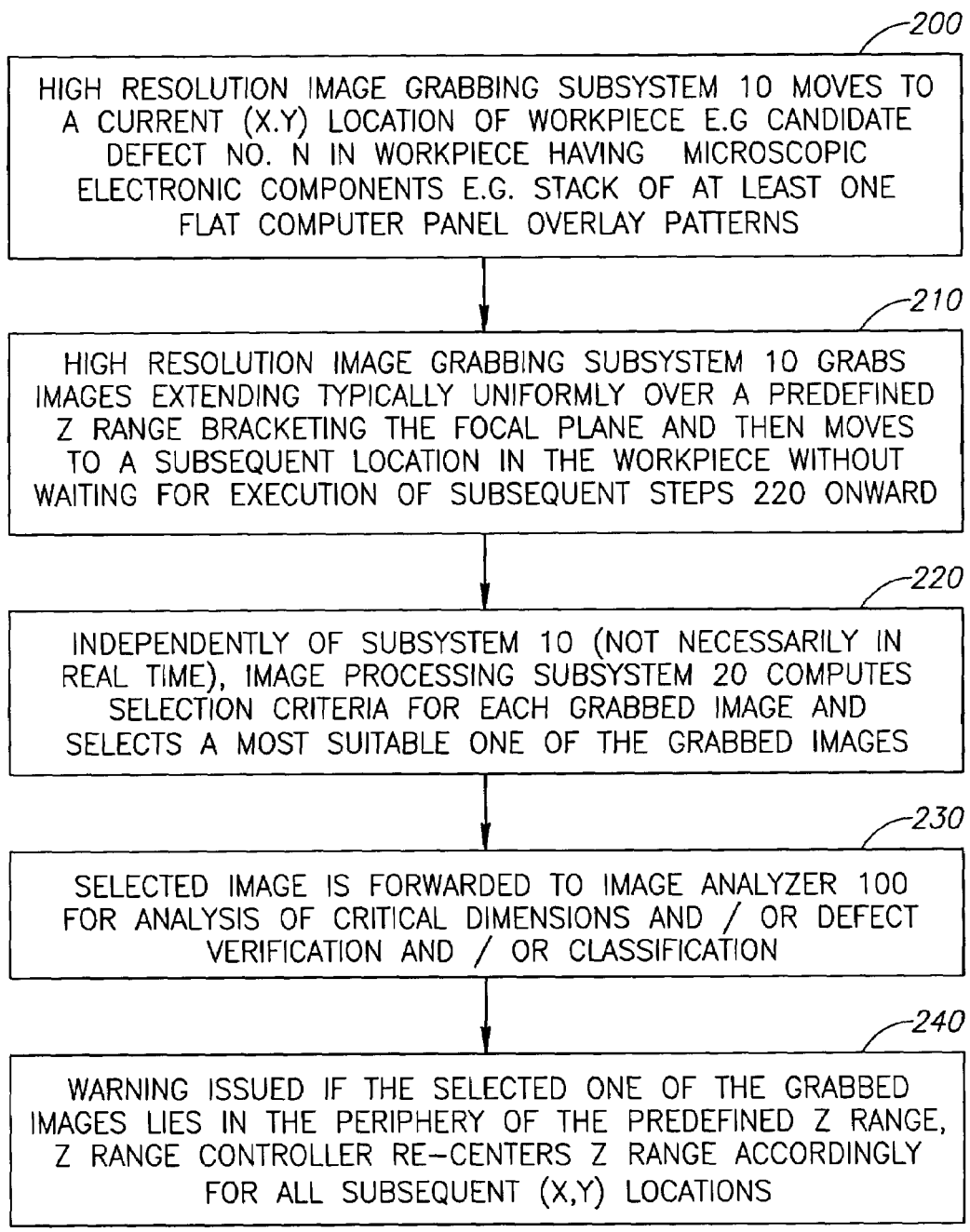
FIG. 2 is a simplified flowchart illustration of a preferred method by which the subsystem separating system controller of FIG. 1 controls the independent operation of the image grabbing and image processing subsystems of FIG. 1.

Reference is now made to FIG. 2 which is a simplified flowchart illustration of a preferred method by which the subsystem separating system controller of FIG. 1 controls the independent operation of the image grabbing and image processing subsystems of FIG. 1.

In step 200, the high magnification image grabbing subsystem 10 moves to a current location e.g. candidate defect no. n in the workpiece portion 65.

In step 210, the high magnification image grabbing subsystem 10 grabs images extending over a predefined z range and then moves to a subsequent location, e.g. candidate defect no. n+1, in the workpiece portion.

In step 220, which is typically performed independently, without feedback from other steps described herein and typically |not in real time, |relative to steps 200 and 210, the image processing subsystem 20 computes selection criteria for each grabbed image and selects one of the grabbed images as being most suitable for further processing. Optionally a warning is issued if the selected one of the grabbed images lies near the periphery of the predefined z range.

In step 230, the most suitable image is forwarded to an image analyzer for further analysis, for example critical dimension analysis or defect verification and classification. It is noted that processing in step 230 may proceed in an uninterrupted pipeline following image frame selection, or after image frames are stored temporarily in a memory.

In step 240, a warning is issued if the selected one of the grabbed images lies near the periphery of the predefined z range. It is the possible for the z-motion controller 60 to re-center the z range accordingly for all subsequent (x,y) locations.

It is appreciated that according to one embodiment of the present invention, the acquisition of images (step 210) proceeds independently of image processing and without being held up while an optimum or acceptable image for further processing is determined or acquired. Thus, in the embodiment shown and described herein, single-pass non-stop imaging of a workpiece portion having microscopic features, at a variety of optical head-workpiece distances, generates a plurality of images, wherein a suitable image is selected for further processing, for example defect verification and critical dimension analysis, from among the plurality of images so generated. However, more generally, the invention also applies to single pass imaging in which the imaging parameter or parameters which is or are varied over the pass is not limited to variation in workpiece-optical head distance but rather also includes other imaging parameters such as illumination wavelength, or illumination intensity, or the angular coverage of illumination, or any predetermined selected combination of the foregoing. For example, the workpiece-optical head distance may be held at a selected focal length, while other imaging parameters, such as illumination wavelength, or illumination intensity, or the angular coverage of illumination, are varied.

In a mode of operation, RGB LEDs (red, green and blue light emitting diodes) are employed in a flash mode in conjunction with a monochrome camera to acquire images of object 65, generally as described in U.S. Pat. No. 6,781,687, the disclosure of which is incorporated in its entirety. Images corresponding to each color are grabbed for each of a plurality of optical head-workpiece distances and the most suitable images are selected for each color separately, since typically, each color has a different best focus. As necessary, the most suitable images for each color may be combined to form a polychromatic image.

It is appreciated that software components of the present invention may, if desired, be implemented in ROM (read only memory) form. The software components may, generally, be implemented in hardware, if desired, using conventional techniques. Also, relative imaging head-workpiece motion along each of the x, y and z axes may be achieved by any suitable method, e.g. by moving either the imaging head in its entirety or in part, or the workpiece or both, along the various axes. Different methods may be used to achieve relative imaging head-workpiece motion along the different axes.

The disclosures of all publications mentioned in the specifications, and of the publications cited therein directly or indirectly, are hereby incorporated by reference in their entirety.

Features of the present invention which are described in the context of separate embodiments may also be provided in combination in a single embodiment. Conversely, features of the invention which are described for brevity in the context of a single embodiment may be provided separately or in any suitable subcombination.

The invention claimed is:

1. Apparatus for high resolution processing of a generally planar workpiece having microscopic features to be imaged, comprising:

a video camera acquiring at least two candidate images for each of selected microscopic portions on generally planar workpiece;

a motion controller operative to effect motion, relative to the workpiece, of at least an optical element of said video camera along an optical axis extending generally normally to a location on a surface of the workpiece, said video camera acquiring said at least two candidate images at selected time intervals, each of said at least two candidate images differing by at least one image parameter;

an image selector operative to select an individual image corresponding to a selected microscopic portion from among said at least two candidate images according to predefined criteria of image quality, said image selector being operative to avoid delaying acquisition of candidate images for said each of selected microscopic portions; and a selected image analyzer operative to analyze said individual image selected by said image selector corresponding to a selected microscopic portion.

2. Apparatus according to claim 1 wherein said selected image analyzer comprises a critical dimension analyzer operative to measure at least one predefined critical dimension of at least a portion of the workpiece.

3. Apparatus according to claim 2, further comprising a candidate defect detector detecting candidate defects on said workpiece, wherein said video camera is operative to obtain said at least two candidate images at a selected location of candidate defects and wherein said critical dimension analyzer is operative to obtain measurements of at least one predefined critical dimension from at least one image selected by said image selector from among said at least two candidate images.

4. Apparatus according to claim 1, further comprising a candidate defect detector detecting candidate defects on said workpiece, wherein said video camera is operative to obtain said at least two candidate images at selected locations of candidate defects.

5. Apparatus according to claim 1 wherein said selected image analyzer comprises a defect classification unit.

6. Apparatus according to claim 1 wherein said motion controller comprises a one-pass motion controller operative to continuously move said camera, said camera including optics, along an axis perpendicular to said generally planar workpiece while said camera acquires images.

7. Apparatus according to claim 6 wherein said one-pass motion controller, and said camera, are configured and arranged to generate a sequence of candidate images of at least a portion of at least one overlay pattern of a flat screen, at least two candidate images being acquired at a different distances between said workpiece and said camera.

8. Apparatus according to claim 1 wherein said motion controller, and said camera, are configured and arranged to generate a sequence of candidate images of at least a portion of at least one overlay pattern of a flat screen, at least two candidate images being acquired at the same distance between said workpiece and said camera, and further comprising an illuminator operative to provide different illumination for each of the at least two candidate images.

9. Apparatus according to claim 1 wherein said motion controller, and said camera, are configured and arranged to generate a sequence of candidate images of at least a portion of at least one overlay pattern of a flat screen, at least two candidate images each being acquired at a different distance between said workpiece and said camera, and further comprising an illuminator operative to provide different illumination for each of the at least two candidate images.

10. Apparatus according to claim 1 wherein said motion controller is operative to move said video camera to next location prior to said image selector selecting an individual image.

11. Apparatus according to claim 1 wherein said camera is operative to acquire a single image for each of additional selected microscopic portions on generally planar workpiece, said selected image analyzer being operative to analyze said single image for additional selected microscopic portions.

12. Apparatus according to claim 1 wherein said image analyzer is additionally operative to verify a candidate defect at said additional selected microscopic portions as being a real defect.

13. Apparatus according to claim 1 wherein:

said video camera is operative to acquire a first at least two images having a first illumination and a second at least two images having a second illumination different from said first illumination, said first at least two images differing from each other by an optical head—workpiece distance and said second at least two images differing from each other by an optical head—workpiece distance, said first at least two images and said second at least two images all corresponding to a selected microscopic portion, said image selector being operative to select a first individual image from among said first at least two images and being further operative to select a second individual image from among said second at least two images; and said selected image analyzer being operative to analyze both said first individual image and said second individual image.

* * * * *